D.C. RESTORATION IN AMPLIFIERS

Filed Feb. 12, 1962 3 Sheets-Sheet 1

INVENTORS
John V. Corney
Anthony Isaacs
BY Kemon, Palmer, Stewart & Estabrook
ATTORNEYS

D.C. RESTORATION IN AMPLIFIERS

Filed Feb. 12, 1962 3 Sheets-Sheet 2

INVENTORS
John V. Corney
Antony Isaacs
BY Kemon, Palmer, Stewart & Estabrook
ATTORNEYS Sept. 21, 1965 J. V. CORNEY ETAL 3,207,998

D.C. RESTORATION IN AMPLIFIERS

Filed Feb. 12, 1962 3 Sheets-Sheet 3

INVENTORS
John V. Corney
Anthony Isaacs
BY Kenyon, Palmer, Stewart & Estabrook
ATTORNEYS 3,207,998
Patented Sept. 21, 1965

3,207,998

D.C. RESTORATION IN AMPLIFIERS

John Victor Corney and Anthony Isaacs, London, England, assignors to Ferguson Radio Corporation Limited, London, England, a British company

Filed Feb. 12, 1962, Ser. No. 172,716
Claims priority, application Great Britain, Feb. 16, 1961, 5,820/61
6 Claims. (Cl. 330—11)

The present invention relates to D.C. restoration in amplifiers and concerns a modification of an invention described in the specification of British Patent Application No. 37,545/60. The invention described therein is concerned with amplifiers for amplifying a particular type of signal, namely a signal which includes regularly recurrent pulses whose tips represent the maximum excursion of the signal in one sense and should lie at a predetermined D.C. level at the output of the amplifier. A common example of such a signal is a television signal in which the pulses are synchronising pulses.

In this prior invention a D.C. amplifier has an output stage coupled to a detector. This detects the said tips of the signal undergoing amplification and provides a first voltage. A second, reference voltage is compared with the first voltage to produce an error signal which is used to vary the D.C. bias on the input of the amplifier so as to reduce any difference between the two said voltages. This circuit can therefore stabilise the D.C. level of a television signal having synchronising pulses whose tips represent the maximum signal excursion in one sense.

A television video signal may however take one of a number of forms shown in FIG. 1 of the accompanying drawings. FIG. 1(*a*) shows a "composite" video signal, that is a signal including synchronising pulses. FIG. 1(*b*) shows a "suppressed" video signal without synchronising pulses in which the signal is at a suppression level or blanking level in the intervals between picture information period. This level still represents the most negative excursion of the signal and the signal (*b*) is, like the signal (*a*), a signal of the type to which the above mentioned previous invention is applicable.

This is not the same with the signal shown in FIG. 1(*c*). Again the signal is a suppressed signal but the suppression level is "balanced" so as to occur within the peak limits of the picture information. The signal (*c*) cannot be D.C. restored by a simple diode clamp, or by the circuit described above. Hitherto such a signal has been D.C. restored by means of a driven clamp, which is enabled only during the suppression period and, when thus enabled clamps the suppression level to a predetermined value. A driven clamp can also be used with signals (*a*) and (*b*) of course. In the case of signal (*a*) either the synchronising level or the suppression level can be clamped, by enabling the clamp during either the line synchronising intervals or the back porch intervals.

Clamps are not essential after every signal-coupling capacitor, but require insertion after several such couplings because of the cumulative low-frequency distortion these introduce. In a multi-stage amplifier the input signal may be clamped to remove hum or low-frequency distortion due to previous A.C. couplings; the output signal may be clamped to remove distortion due to the internal A.C. couplings of the amplifier. An amplifier of moderate gain may be clamped at the input only and be direct-coupled thereafter; the D.C. stability of the output signal then depends on the D.C. gain-stability of the amplifier.

The present invention provides an improvement over the known driven clamp. Briefly an amplifier for amplifying a signal including regularly recurrent intervals, during all of which intervals it is required that the signal level should assume a constant D.C. level and has its output stage coupled to a sampler which is adapted to sample the signal in the said intervals. A comparator compares a potential produced by the sampler with a first fixed reference potential selected to determine the said D.C. level at the amplifier output and produces an error signal representative of the difference between the said produced and first reference potentials. A source of a second, variable reference potential is responsive to the error signal to vary the second reference potential and a driven clamp operates during the said intervals to clamp the level of the input signal to the amplifier to the second reference potential. In this way any difference between the potential produced by the sampler and the first reference potential is reduced to substantially zero.

This system has a number of advantages. Large distortion components, for example mains hum, present in the input signal are readily removed. If the loop gain is high the said difference will always be maintained small. Since an overall feedback loop is employed, there is a strong stabilizing action against variations in D.C. output level due to changes in gain of the amplifier, component tolerances, and so on.

The invention will now be described by way of example with reference to the remaining figures of the accompanying drawings in which.

Figure 2:
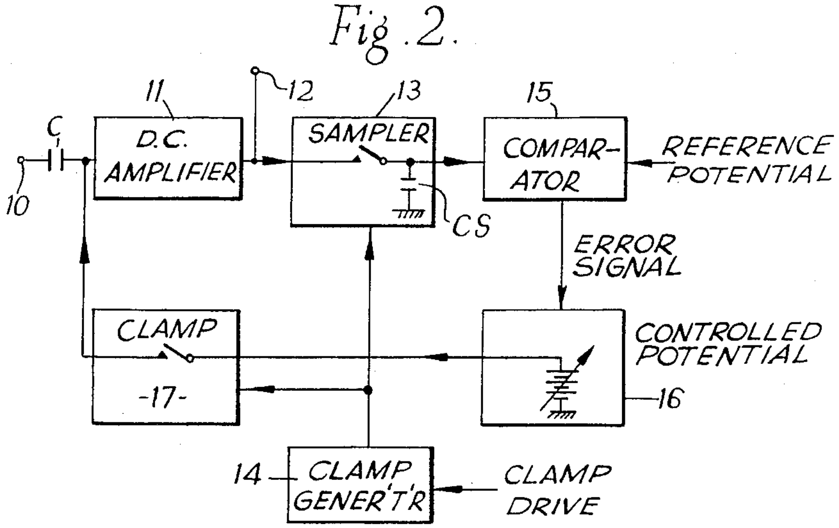
FIGURE 2 is a block diagram of a system embodying the invention.
Figure 3:
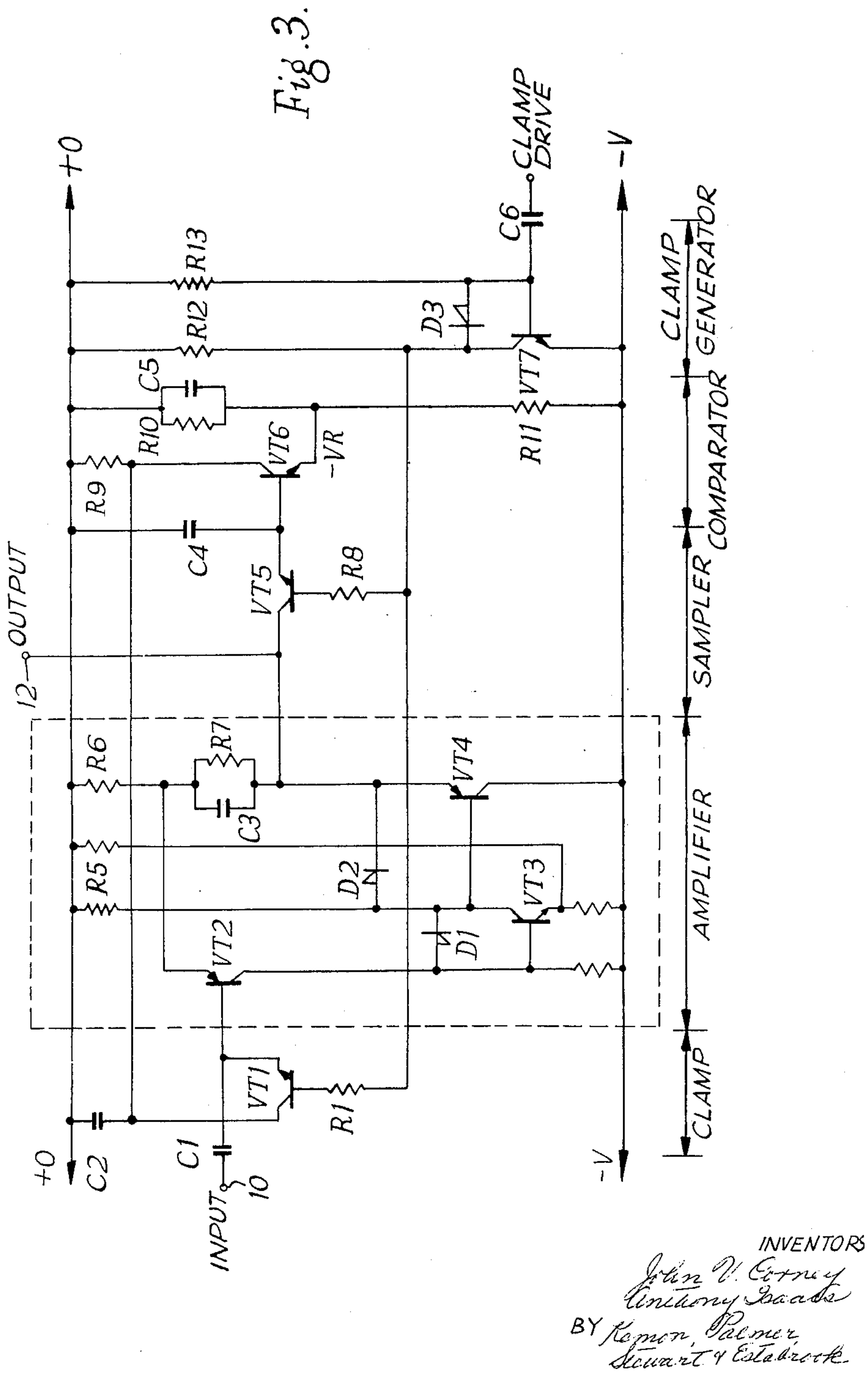
FIGURES 3 and 4 are circuit diagrams of two detailed embodiments.

The preferred embodiment of our invention is represented in the block diagram of FIGURE 2. A video signal applied to the terminal 10 will be A.C. coupled by capacitor C to a D.C. amplifier 11. The amplified signal is then applied in parallel to an output terminal 12 and to a sampler 13. The sampler 13 charges and discharges a capacitor CS in response to the D.C. level of the signal at the input of the sampler. The charge on the capacitor CS is applied as one of two inputs to a comparator 15. The other input to the comparator is from a fixed reference potential—VR (FIG. 3). The difference between these two potentials is the output of the comparator and is applied to a variable control potential device 16. The controlled potential is varied in accordance with the error signal from the comparator and is applied to a clamp 17; the clamp operates on the input of the D.C. amplifier 11. The clamp 17 and the sampler 13 are driven by a clamp generator 14 which is in turn driven by the synch pulses.

In FIG. 2 an input video signal applied to a terminal 10 is A.C. coupled through a capacitor C to the input of a D.C. amplifier 11 whose output appears at a terminal 12. The signal is sampled periodically at the points where normal clamping would otherwise be employed, for example during the back porch intervals, by means of a sampler 13. This is operated by pulses provided from a clamp generator 14 as they would be ordinarily for normal clamping. The sampler produces an output potential across a capacitor CS this being compared by a comparator 15 with a fixed reference potential to produce an error signal. The error signal is applied to a source 16 of controlled potential (variable under the control of the error signal) which potential is applied to a clamp 17 driven by the pulses from the clamp generator 14. The driven clamp 17 clamps the back porch level of the signal at the *input* to the amplifier 11 to the said controlled potential. The error signal varies the controlled potential in such a sense as to reduce the difference between the sampler output potential and the reference potential.

Figure 4:
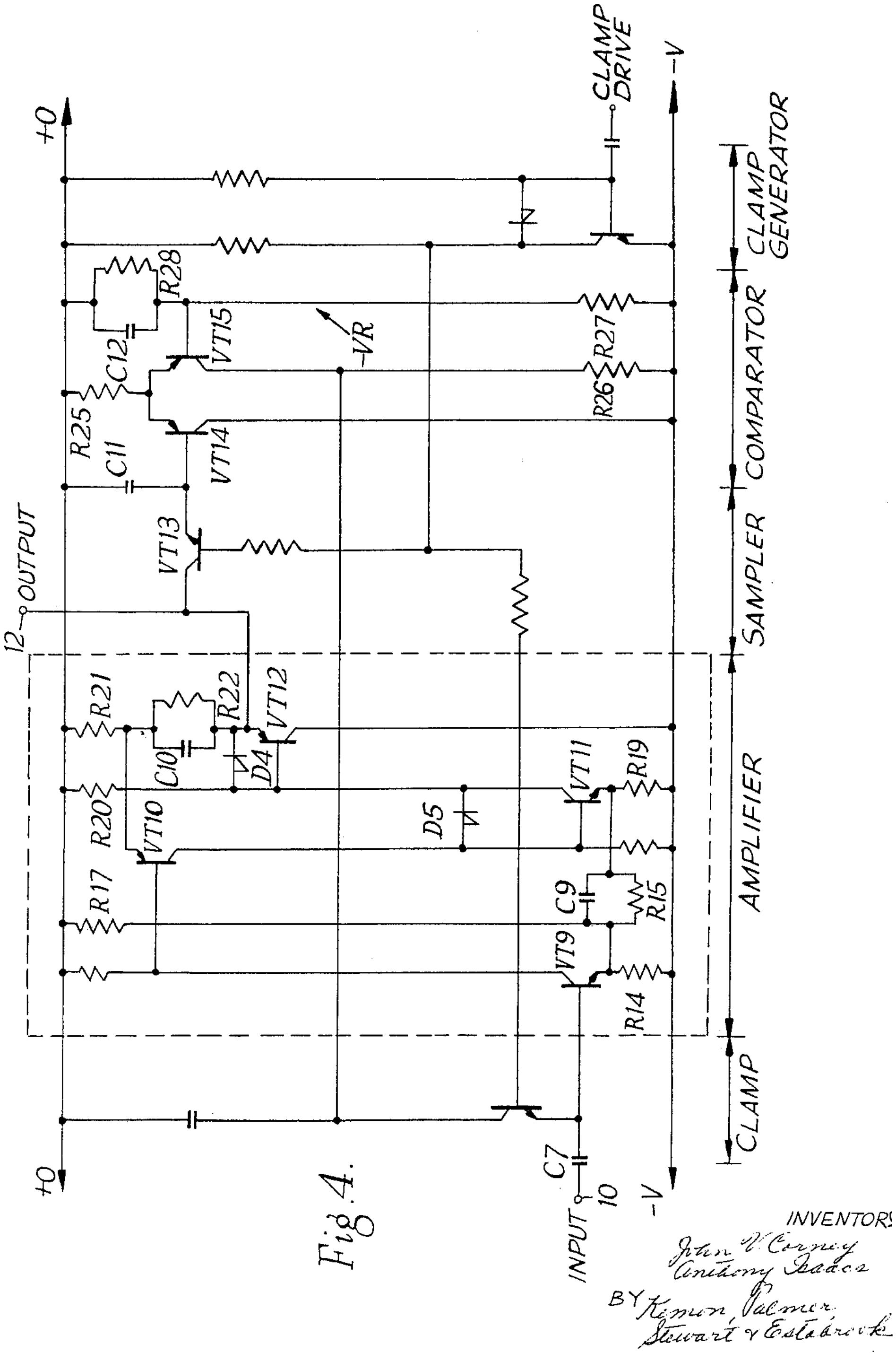

In the ensuing description of FIGS. 3 and 4 the actual configurations of the circuits will not be described since these are fully apparent from the diagrams. The characterisation and functions of the different parts of the circuits will be described using the references shown on the diagrams. At the foot of each diagram in these two figures the sections of the circuit corresponding to the blocks 11, 13, 14, 15 and 17 of FIG. 2 have been indicated. The capacitors C and CS in FIG. 2 correspond respectively to the capacitors C1 and C4 in FIG. 3 and to the capacitors C7 and C11 in FIG. 4.

In FIG. 3, an input video signal is A.C. coupled through a capacitor C1 to the base of a transistor VT2 of a conventional D.C. amplifier. The output of the D.C. amplifier is taken from the bottom of the parallel combination of capacitor C3 and resistor R7 and applied in parallel to an output terminal 12 and to the collector of a symmetrical transistor VT5. The essentially symmetrical NPN transistor VT5 and base resistor R8 constitute the sampler of our invention. VT5 is normally cut off and only conducts during sampling. During sampling, the capacitor C4 connected between the emitter of VT5 and the zero reference level charges or discharges through VT5. The capacitor C4 is connected between the base of a comparator circuit transistor VT6 and the zero reference level. The charge on the capacitor C4 will determine whether or not the transistor VT6 will conduct. The resistors R10 and R11 connected between the zero reference level and a negative D.C. supply constitute a voltage divider network to apply emitter bias to the transistor VT6 of a level representing minus VR volts. The emitter bias is equal to the fixed reference potential where said fixed reference potential is equivalent to the desired clamping level. The voltage divider is decoupled by a capacitor C5 in parallel to R10. Conduction of transistor VT6 is dependent upon whether capacitor C4 makes the base of transistor VT6 negative with respect to its emitter bias-VR or not. If VT6 conducts, then the control variable potential determined by the charge on capacitor C2 is increased as the capacitor is charged through the transistor. If the charge on C4 causes the transistor VT6 to be cut off, then the control variable potential that is the charge on capacitor C2 discharges through the resistor R9.

The D.C. clamp consists of the transistor VT1, its base resistor R1 and the capacitor C1. The capacity of C2 is large with respect to the capacitor C1, thus the bias potential on the capacitor C2 will remain substantially unchanged during clamping. The clamping capacitor C1 will charge or discharge depending upon the charging or discharging of the capacitor C2 and thus will adjust the reference level of the video input signal to the desired level of the fixed reference.

The transistor VT7 and its associated circuits constitute a clamp generator. The value of R13 in the base circuit of the transistor VT7 is so chosen as to allow the transistor VT7 to bottom thus causing the transistors VT1 and VT5 to be normally cut off. Clamp drive for the clamp generator VT7 is provided by the synch pulses of the video signal and is applied through the coupling capacitor C6 to the base of VT7. The signal thus generated by VT7 is applied to the bases of VT1 and VT5, the clamp and sampler respectively, if the values of R1 and R8 are chosen large with respect to R12.

The circuit of FIGURE 4 is different from that of FIGURE 3 in that the conventional amplifier utilizes three stages of inversion in cascade. As a consequence of this, it is necessary that the comparator be non-inverting. This requires the use of the transistors VT14 and VT15 instead of the single transistor VT6 as shown in FIGURE 3. The comparator of FIGURE 4 utilizes a long tailed pair of transistors VT14 and VT15 operating off the same fixed reference potential as VT6 does in FIGURE 3. The fixed reference potential is applied to the base of VT15 and is compared with the sampled output as applied to the base of VT14. The controlled bias potential is produced at the collector VT15 and will vary in the same sense as the base potential of VT14. The remainder of the circuit is similar to FIGURE 3.

It is believed that the operation of our circuits is now obvious to those skilled in the art. However, we will now undertake to explain that operation.

In FIGURE 3 the amplifier proper contains the cascaded inverters VT2 and VT3 and an emitter-follower VT4; signal feedback is applied to the emitter of transistor VT2 from the junction of resistors R6 and R7 forming the emitter load of transistor VT4. capacitor C3 in parallel with resistor R7 is a "phase-advance" capacitors controlling high-frequency transient response. The diode D1 reduces carrier storage in transistor VT3 when this is bottomed. The diode D2 connects the load resistor R4 at the collector of transistor VT3 in parallel with the output load R6, R7 if VT4 is cut off, due to its capacitive load, by a fast positive-going signal at the base of transistors VT4. Resistor R5 applies emitter bias to the transistor VT3 to offset leakage current in the transistor VT2 which might otherwise limit the maximum positive output potential. If the open-loop voltage gain from the base of VT2 to the emitter of VT4 is large, the closed-loop gain will be substantially $(R6+R7)/R6$.

Figure 1:
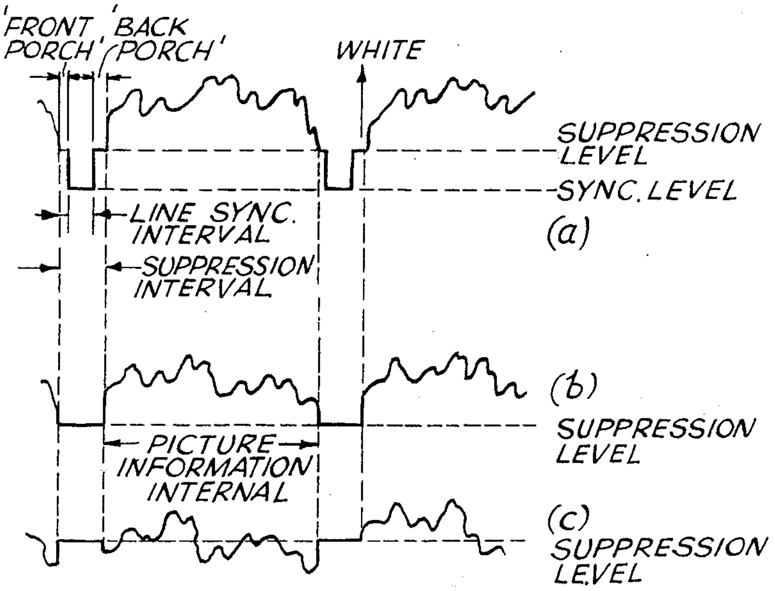
FIGURE 1 is a diagram of various forms of video signals that may be applied to the system embodying the invention.

The transistor VT7 generates the sampling and clamping pulse. This transistor is normally bottomed by base current from resistor R13. The bases of the two NPN transistors VT1 and VT5 forming the clamp and sampler respectively are then substantially at the supply potential −V and the two transistors are cut off. The negative edge of a suitable rectangular waveform, for example the synchronising pulse separated from the signal shown in FIG. 1(*a*), applied to the capacitor C6 cuts off current in the transistor VT7 for a period of from 1 microsecond to 4 microseconds for example, this being determined by the product C6R13 and the pulse input amplitude, provided this is sustained negative for a period greater than the generated pulse width. A positive-going sampling and clamping pulse of 1 microsecond to 4 microseconds duration is thus generated at the collector of transistor VT7. The collector potential rises to the zero volts supply potential if R1 and R8 are both substantially greater than R12. If positive-going synchronising pulses are applied to the capacitor C6 the sampling pulse is generated by the trailing edge of the synchronising pulse, that is, during the back porch interval of FIG. 1(*a*). If negative-going synchronising pulses are applied to the capacitor C6 the sampling pulses are generated during the synchronising pulse period. Positive-going synchronising pulses applied to the capacitor C6 will, therefore, clamp the suppression level of FIG. 1(*a*) to the fixed reference potential. Negative-going synchronising pulses on the other hand will clamp the synchronising pulse tips of FIG. 1(*a*) to the fixed reference potential. The diode D3 reduces carrier storage in the transistor VT7.

The two NPN transistors VT1 and VT5 are substantially symmetrical. Thus whichever electrode is forward biased with respect to the base functions as emitter, the other, if reversed biased functioning as collector. Either mode of operation gives substantially the same characteristics.

If C4 is charged less positively than the output potential of the amplifier during sampling, the transistor VT5 conducts as an emitter-follower when the collector of transistor VT7 becomes more positive than the potential on C4. C4 charges to the output potential, the potential on C4 and the base potential of transistor VT5 being caught at this level as VT5 bottoms. If on the other hand the potential of the amplifier on C4 is more positive than the output potential during sampling C4 discharges through VT5 until VT5 bottoms with all electrodes caught at substantially the output potential. At the end of the sampling pulses the collector of VT7 bottoms substantially at the supply potential —V, VT5 is cut off and C4 is left charged to a potential substantially equal to the amplifier output potential during sampling. If the signal feedback in the amplifier is adequate the amplifier output impedance is a few ohms only and sampling causes little disturbance of the output potential.

The potential on the capacitors C4 is compared by the transistors VT6 with the fixed reference potential —VR developed by the potential divider chain R10, R11 decoupled by the capacitor C5. If the potential on C4 is more positive than —VR the transistor VT6 conducts charging capacitor C2 negatively. If the potential on C4 is less positive than —VR VT6 is cut off and C2 discharges through R9 towards the zero volts supply potential. The input capacitor C1 is charged or discharged from or into the controlled bias source constituted by the capacitor C2 during the clamping period when the transistor VT1 conducts, acting substantially as the transistor VT5 to bring the potential on the capacitor C1 to the controlled bias potential. If the sample output level becomes more positive than —VR the controlled bias potential becomes more negative, the clamped potential on C1 therefore becomes more negative and the sampled output potential is reduced since the amplifier proper is non-inverting. If the sampled output level becomes more negative than —VR the controlled bias rises, the clamped potential C1 rises and the sampled output potential rises. If C1 is much smaller than C2 the controlled bias potential on capacitor C2 is substantially unchanged during the clamping interval.

The system will stabilise with the sampled output potential just positive to —VR so that the transistor VT6 conducts just sufficiently to produce across C2 and R9 a controlled bias potential adequate to forward bias the base of transistor VT2 so as to sustain the output potential. The capacitor C1 should be of sufficient capacitance not to be discharged materially by base current in the transistor VT2 between clamping pulses. C4 must be of sufficient capacitance not to be discharged materially by base current in VT6 between sampling pulses. Since the emitter of transistor VT2 is always more positive than the emitter of transistor VT4 bias required at the base of VT2 is always more positive than the sampled output potential which is substantially —VR. The required controlled bias at the collector of transistor VT6 always lies between —VR and the zero volts supply potential for any value of —VR between the zero and —V supply potentials.

The circuit shown in FIG. 4 differs from that of FIG. 3 only in that the amplifier proper contains three cascaded inverter stages VT9, VT10 and VT11. In consequence the comparator formed by transistors VT14 and VT15 must be non-inverting in order to provide degenerative bias feedback.

In the amplifier proper of FIG. 4, if R19 is infinite, the closed-loop gain approaches:

$$R20/(R14+R15)\times(R14-R15)/R14=R20/R14$$

The feedback networks R21, R22 and R14, R15 control the distribution of effective stage gain.

The capacitors C9 and C10 are "phase-advance" capacitors controlling high-frequency transient response. R17 biases the emitter of transistor VT9 to offset the effect of leakage current VT9 which would otherwise limit the maximum positive output potential. If R19 is infinite R14 must be very low if substantial signal gain is required and R17 may be sufficiently low to waste appreciable high-tension current.

If $R19=R14$ the gain approaches $$(R20/R19)\times(R15/R14)=(R20\times R15)/(R14)^2$$

If $(R20)^2=R14\times R15$ this latter expression becomes $$(R20/R14)^2\times(R20^2/R14)=(R20/R14)^3$$

If $(R21+R22)/R21=(R20/R14)^2$ the effective stage gains will be substantially equal.

Under these conditions R14 may be substantially larger in value than would be necessary if R19 were infinite. The diode D5 reduces carrier storage in transistor VT11 when this is bottomed. The diode D4 connects R20 in parallel with $R21+R22$ should the capacitor C10 cause the emitter-follower VT12 to be cut off by a fast positive-going signal at the base of VT12.

The sampled output potential developed by sampler VT13 across the capacitor C11 is compared in the long-tailed pair VT14 and VT15 with a fixed reference potential —VR developed by the potential divider R27, R28 decoupled by capacitor C12. The controlled bias potential is produced at the collector of the transistors VT15 and changes in the same sense as the base potential of transistor VT14. Since the amplifier proper is an inverter amplifier the bias feedback is degenerative and the system stabilises with the sampled output level substantially equal to —VR.

The bias potential required on the base of transistor VT9 will be near the —V potential so that —VR will in general be more positive than the controlled bias at the collector VT15. If the base bias potential for VT9 is more positive than the chosen —VR transistors VT14 and VT15 should be NPN type instead of PNP type with resistors R25 returned to the —V supply potential and R26 and the collector of VT14 returned to the zero volt supply potential.

We claim:

1. An electrical system comprising a D.C. amplifier for amplifying a signal including regularly recurrent intervals, during all of which intervals it is required that the signal level should assume a constant D.C. level, said amplifier having an input and an output stage, a sampler, means for rendering the sampler active only during the said intervals, the sampler being coupled to said output stage to sample the signal in the said intervals and produce thereby a potential, a comparator for comparing said potential produced by the sampler with a first fixed reference potential selected equal to the desired constant D.C. level at the amplifier output so as to produce an error signal representative of the difference between the said produced and first reference potentials, a source of a second variable reference potential and a driven clamp coupled between said second source and said amplifier, means for rendering the clamp active only during the said intervals to clamp the level of the input signal to the amplifier to the second reference potential, the said second variable source being responsive to said error signal to vary said second reference potential so as to reduce any difference between said potential produced by said sampler and said first reference potential.

2. An electrical system according to claim 1, wherein said sampler includes a capacitor which is connected to the output voltage of the amplifier during the sampling periods.

3. An electrical system according to claim 1 wherein said comparator comprises an active circuit element and means for controlling said element differentially in response to voltage inputs as provided by the sampler and by a first fixed reference potential.

4. An electrical system according to claim 3 wherein said means for differentially controlling said active element consists of a capacitor with one terminal connected between one terminal of said active element and the output of the sampler and the other terminal of the capacitor connected to a potential source, and a voltage divider connected across another terminal of said active element.

5. An electrical system according to claim 3 comprising in combination a load resistor connected to a third terminal of said active element, and said source for producing a second variable potential being connected to said load resistor.

6. An electrical system according to claim 5 wherein said source for producing a second variable reference potential to drive a clamp comprises a capacitor.

References Cited by the Examiner

UNITED STATES PATENTS

| | | | |
|---|---|---|---|
| 2,368,096 | 1/45 | Bedford | 330—11 X |
| 2,402,444 | 6/46 | Poch | 178—7.2 |

FOREIGN PATENTS

| | | |
|---|---|---|
| 731,168 | 6/55 | Great Britain. |

ROY LAKE, *Primary Examiner.*

NATHAN KAUFMAN, *Examiner.*